United States Patent
Fujimura et al.

(10) Patent No.: US 11,021,373 B2
(45) Date of Patent: Jun. 1, 2021

(54) AMMONIA PRODUCTION PLANT AND AMMONIA PRODUCTION METHOD

(71) Applicant: JGC Corporation, Yokohama (JP)

(72) Inventors: Yasushi Fujimura, Yokohama (JP); Momoko Kato, Yokohama (JP)

(73) Assignee: JGC Corporation

( * ) Notice: Subject to any disclaimer, the term of this patent is extended or adjusted under 35 U.S.C. 154(b) by 0 days.

(21) Appl. No.: 16/762,605

(22) PCT Filed: May 11, 2018

(86) PCT No.: PCT/JP2018/018384
§ 371 (c)(1),
(2) Date: May 8, 2020

(87) PCT Pub. No.: WO2019/215925
PCT Pub. Date: Nov. 14, 2019

(65) Prior Publication Data
US 2021/0053834 A1   Feb. 25, 2021

(51) Int. Cl.
*C01C 1/04* (2006.01)
*C01B 3/48* (2006.01)

(52) U.S. Cl.
CPC .............. *C01C 1/0452* (2013.01); *C01B 3/48* (2013.01); *C01B 2203/0222* (2013.01); *C01B 2203/068* (2013.01); *C01B 2203/0872* (2013.01)

(58) Field of Classification Search
CPC ................................ C01C 1/0452; C01B 3/48

USPC ......................................................... 423/359
See application file for complete search history.

(56) References Cited

U.S. PATENT DOCUMENTS

2006/0228284 A1* 10/2006 Schmidt ................. C10K 1/004
423/352

FOREIGN PATENT DOCUMENTS

| JP | 2008222480 A | 9/2008 |
|---|---|---|
| JP | 2008535768 A | 9/2008 |
| JP | 2014185583 A | 10/2014 |
| WO | 2014042042 A1 | 3/2014 |
| WO | 2015/193108 A1 | 12/2015 |
| WO | 2017149718 A1 | 9/2017 |

* cited by examiner

*Primary Examiner* — Douglas B Call
(74) *Attorney, Agent, or Firm* — Jordan and Koda, PLLC

(57) ABSTRACT

An ammonia production plant includes an ammonia synthesis facility; a synthesis gas generating facility which generates a synthesis gas for synthesizing ammonia from the carbon-based raw material; and a power generating facility which obtains power. The synthesis gas generating facility includes an exhaust heat recovery unit which recovers exhaust heat. The power generating facility includes a combustion device which burns oxygen and fuel and a gas turbine which is driven by using a combustion gas containing a $CO_2$ gas obtained by the combustion device as power so as to generate power and is configured to supply the $CO_2$ gas discharged from the gas turbine as a recycle gas to the combustion device. The power obtained by the power generating facility powers the ammonia synthesis facility. The exhaust heat recovered by the exhaust heat recovery unit is used to heat the recycle gas.

15 Claims, 3 Drawing Sheets

AMMONIA PRODUCTION PLANT AND AMMONIA PRODUCTION METHOD

BACKGROUND OF THE INVENTION

The present invention relates to an ammonia production plant and an ammonia production method having high energy saving and environmental friendliness.

Ammonia has been gaining attention as a new energy carrier and its advantages have been proved in recent supply chain assessments. Further, since CO2 is not discharged during the combustion of ammonia, the ammonia is expected as promising fuel.

Conventionally, ammonia has been produced by a catalytic reaction using, for example, hydrogen generated by a reforming reaction of a carbon-based material such as a natural gas and nitrogen in the air as raw materials.

An ammonia production plant is a plant that requires large power. As main power required for the ammonia production plant, examples include a compressor of a cryogenic separation device that separates air into oxygen and nitrogen, a raw material gas compressor that pressurizes a raw material gas of ammonia to a reaction pressure, and a refrigeration compressor that generates cold heat for cooling and separating synthesized ammonia. In the conventional ammonia production plant, power is generated by steam generated by recovering waste heat from the process. However, when the amount of steam is less than the required power, separate fuel is burned in a heating furnace so as to generate steam using obtained heat and to increase the amount of steam, a gas turbine is used together, or power is supplied from outside. In this way, the required power is supplied.

As a conventional ammonia production plant contrived to save energy, Patent Document 1 (WO 2015/193108) describes a method of producing ammonia and a derivative of ammonia from a natural gas supply raw material. Patent Document 1 proposes that a gas turbine supplies at least a part of power required by a power user consuming a large amount of power such as a gas compressor. Patent Document 1 describes that a part of the natural gas supply raw material is supplied as fuel to the gas turbine and the power generated by the gas turbine is used for at least a part of the power consumed by the power user. Further, Patent Document 1 also describes that at least a part of the exhaust heat of the gas turbine is recovered as low-grade heat of a heat user of the ammonia production plant.

Further, in the conventional ammonia production plant such as the ammonia production plant described in Patent Document 1, hydrogen which is a raw material of ammonia is produced by reforming the carbon-based raw material using water vapor.

$CO_2$ discharged from the ammonia production plant is separated into process $CO_2$ recovered by a device (for example, also referred to as Acid Gas Removal, AGR) that separates an acidic gas from a process gas using a chemical absorption method or the like and flue gas $CO_2$ contained in an exhaust gas discharged from a combustion furnaces due to air combustion of reformers and boilers. In general, the $CO_2$ partial pressure in the exhaust gas from air combustion (hereinafter, flue gas) is low, large energy of 2.5 to 3.0 GJ/ton-$CO_2$ is required when recovering $CO_2$, and hence the thermal efficiency of the plant is remarkably lowered. Further, when considering economics, since the upper limit of the recovery rate of $CO_2$ from the flue gas is about 90%, there is a problem that further recovery is difficult.

CITATION LIST

Patent Document

Patent Document 1: WO 2015/193108

SUMMARY OF THE INVENTION

Technical Problem

In the ammonia production plant, larger plant capacity is required so as to reduce cost due to scale merit as ammonia demands increase. Further, energy saving, reduction of $CO_2$ gas emission, and recovery of $CO_2$ gas have become issues as demands for environmental friendliness increase.

For this reason, it is required to construct a highly energy-saving ammonia production plant capable of reducing the emission of $CO_2$ gas and recovering the discharged $CO_2$ gas with high efficiency by suppressing the consumption amount of the raw material for synthesizing ammonia.

Solution to Problem

Here, the present inventors studied from the viewpoint of the superiority of increasing the energy saving of the plant and reducing $CO_2$ emissions, found that the above-described problems could be solved by a first aspect and a second aspect below, and completed the invention.

A first aspect of an ammonia production plant according to the invention is an ammonia production plant for producing ammonia from a carbon-based raw material, including: an ammonia synthesis facility which synthesizes ammonia; a synthesis gas generating facility which generates a synthesis gas for synthesizing ammonia from the carbon-based raw material; and a power generating facility which obtains power, in which the synthesis gas generating facility includes an exhaust heat recovery unit which recovers exhaust heat generated when generating the synthesis gas, in which the power generating facility includes a combustion device which burns oxygen and fuel and a gas turbine which is driven by using a combustion gas containing a $CO_2$ gas obtained by the combustion device as power so as to generate power and is configured to supply the $CO_2$ gas discharged from the gas turbine as a recycle gas to the combustion device, in which the power obtained by the power generating facility is used as at least power of the ammonia synthesis facility, and in which the exhaust heat recovered by the exhaust heat recovery unit is used to heat the recycle gas.

Further, a second aspect of the ammonia production plant according to the invention is an ammonia production plant for producing ammonia from a carbon-based raw material, including: an ammonia synthesis facility which synthesizes ammonia; a synthesis gas generating facility which generates a synthesis gas for synthesizing ammonia from the carbon-based raw material; and a power generating facility which obtains power, in which the synthesis gas generating facility includes an exhaust heat recovery unit which recovers exhaust heat generated when generating the synthesis gas, in which the power generating facility includes a combustion device which burns oxygen and fuel, a water vapor generating device which generates water vapor by exhaust heat of a combustion gas containing a $CO_2$ gas obtained from the combustion device, and a steam turbine which is driven by using the water vapor generated in the water vapor generating device as power so as to generate power and is configured to supply the $CO_2$ gas discharged from the water vapor generating device as a recycle gas to the combustion device, in which the power obtained by the power generating facility is used as at least power of the ammonia synthesis facility, and in which the exhaust heat recovered by the exhaust heat recovery unit is used to generate water vapor in the water vapor generating device.

Advantageous Effects of the Invention

According to the invention, it is possible to construct an ammonia production plant and an ammonia production method capable of producing ammonia having a small emission amount of $CO_2$ with much less energy than a conventional ammonia production plant.

DESCRIPTION OF EMBODIMENTS

Hereinafter, detailed aspects of the invention will be described with reference to the drawings, but the invention is not limited to the aspects of the drawings. In the description below, a positional relationship between devices and facilities may be expressed as "upstream" or "downstream" based on the flow direction of a fluid such as a gas. Further, in the following description, carbon monoxide may be expressed as CO, carbon dioxide may be expressed as $CO_2$, and hydrogen may be expressed as $H_2$ for convenience of description.

First Aspect

Figure 1:
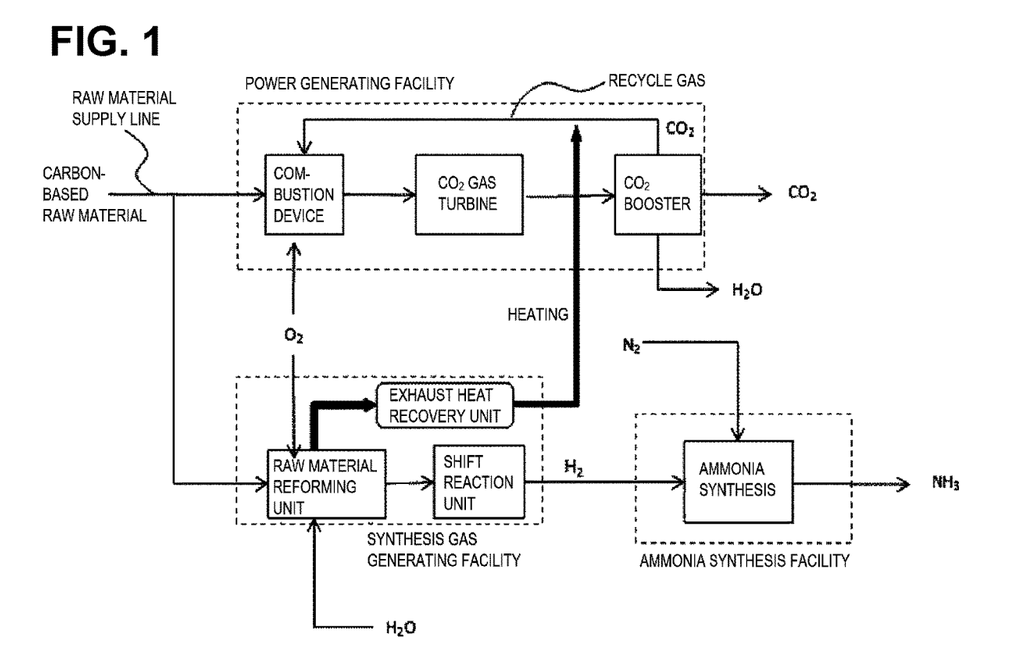
FIG. 1 illustrates a schematic view of a first aspect of an ammonia production plant according to the invention.

FIG. 1 illustrates a schematic view of a first aspect of an ammonia production plant according to the embodiment.

An aspect of an ammonia production plant according to the invention is an ammonia production plant for producing ammonia from a carbon-based raw material, including an ammonia synthesis facility which synthesizes ammonia, a synthesis gas generating facility which generates a synthesis gas for synthesizing ammonia from the carbon-based raw material, and a power generating facility which obtains power.

The synthesis gas generating facility is a facility which generates a synthesis gas containing $H_2$ as a main component from the carbon-based raw material. The synthesis gas generating facility includes an exhaust heat recovery unit which recovers exhaust heat when generating a synthesis gas. The exhaust heat which is recovered by the exhaust heat recovery unit is used to heat a recycle gas to be described later. In addition, the synthesis gas may contain CO, $CO_2$, or methane generated when generating a synthesis gas in addition to $H_2$.

A natural gas or coal (coal gas obtained by gasifying coal) is used as the carbon-based material. These raw materials contain hydrocarbons having 1 or more carbon atoms.

When a natural gas is used as the carbon-based raw material, the synthesis gas generating facility reforms the natural gas so as to generate a synthesis gas. The exhaust heat recovery unit recovers exhaust heat after the natural gas reforming reaction. Meanwhile, when coal is used as the carbon-based raw material, the synthesis gas generating facility gasifies the coal so as to generate a synthesis gas. The exhaust heat recovery unit recovers exhaust heat after the coal gasifying reaction. In the coal gasifying reaction, oxygen reacts with coal so as to generate a synthesis gas.

In the embodiment, a case in which a natural gas is used as the carbon-based raw material will be described.

The synthesis gas generating facility of the embodiment is configured to recover a $CO_2$ gas contained in the synthesis gas. Specifically, the synthesis gas generating facility may include a shift reaction unit which reacts carbon monoxide in the synthesis gas obtained by the reforming reaction with water vapor (shift reaction) to generate hydrogen and carbon dioxide. Then, the synthesis gas generating facility may include a $CO_2$ recovery unit which recovers carbon dioxide obtained by the shift reaction (specifically, see FIG. 2 to be described later).

Exhaust heat generated after reforming a natural gas is recovered by the exhaust heat recovery unit. Further, since the shift reaction is an exothermic reaction, the generated heat can also be recovered in the exhaust heat recovery unit.

Hydrogen obtained by separating a $CO_2$ gas from a gas obtained by the shift reaction is sent to the ammonia synthesis facility by a compressor or the like as a raw material gas for the ammonia synthesis reaction. In the ammonia synthesis facility, ammonia is synthesized by reacting hydrogen generated by the synthesis gas generating facility with nitrogen supplied from a separation device (see FIG. 2) to be described later.

The power generating facility includes a combustion device which burns oxygen and fuel and a gas turbine which is driven by using a combustion gas containing a $CO_2$ gas obtained by the combustion device as power so as to generate power and is configured to supply the $CO_2$ gas discharged from the gas turbine as a recycle gas to the combustion device. The power generating facility of the embodiment further includes a booster which supplies the $CO_2$ gas discharged from the gas turbine as a recycle gas to the combustion device.

The power obtained by the power generating facility is used as at least the power of the ammonia synthesis facility. Specifically, the ammonia synthesis facility is a facility which requires large power and the power obtained by the power generating facility is used as the power of a raw material gas compressor which raises a pressure of a raw material gas (a mixed gas of nitrogen and hydrogen) of ammonia to a reaction pressure and a refrigeration compressor which generates cold heat for cooling and separating the synthesized ammonia. Further, the power obtained by the power generating facility may be used as the power of an air compressor installed in the separation device (cryogenic separation device) illustrated in FIG. 2. Further, the power obtained by the power generating facility may be used in the synthesis gas generating facility or the power generating facility.

The combustion device is a device which burns oxygen and a natural gas so as to obtain a combustion gas containing $CO_2$ gas and water vapor by the combustion reaction. The combustion device of the embodiment burns high-purity oxygen and a natural gas. In the combustion device of the embodiment, the $CO_2$ concentration in the obtained combustion gas becomes higher (the $CO_2$ partial pressure in the combustion gas becomes higher) as compared with a case in which air is supplied to burn a natural gas. For that reason, the energy required for $CO_2$ gas recovery can be reduced and the $CO_2$ gas recovery rate can be increased.

The gas turbine is driven by using the combustion gas containing a $CO_2$ gas obtained by the combustion device as power. The combustion gas of 15 bar to 300 bar and 800° C. to 1300° C. is supplied to the gas turbine and the combustion gas having been used to generate power is discharged from the gas turbine in a state in which the pressure and the temperature are lowered to about 1 bar to 80 bar and 500° C. to 700° C.

The booster pressurizes the $CO_2$ gas discharged from the gas turbine. $CO_2$ pressurized by the booster is sent as a recycle gas to the combustion device. Since the state of $CO_2$ pressurized by the booster is determined by an operation pressure and an operation temperature, $CO_2$ at the outlet of the booster is a gas, a liquid, or a gas-liquid mixture. In the embodiment, $CO_2$ which is pressurized and sent to the combustion device is heated by the exhaust heat recovered by the exhaust heat recovery unit. By this heating, the thermal efficiency of the combustion device can be further improved and a process capable of producing ammonia with far less energy than the conventional method can be constructed.

Further, in the embodiment, the booster pressurizes the $CO_2$ gas discharged from the gas turbine and the $CO_2$ gas recovered by the synthesis gas generating facility. That is, the $CO_2$ gas which is separated and recovered from the synthesis gas generating facility can be combined in the booster and can be sent as a recycle gas to the combustion device. In this case, since the booster can be shared in order to pressurize the $CO_2$ gas separated and recovered from the synthesis gas generating facility, there is no need to particularly provide a boosting facility in the synthesis gas generating facility and hence the facility cost can be suppressed. The synthesis gas generating facility includes a $CO_2$ recovery unit such as a device for separating an acidic gas by a chemical absorption method using a solvent such as an amine and a separation device for a pressure swing adsorption (PSA) method and a cryogenic separation method (specifically, see FIG. 2 described later) and can separate and recover $CO_2$.

Water vapor in the exhaust gas of the gas turbine is separated and recovered as water before pressurizing $CO_2$ ($H_2O$ discharged from the booster of FIG. 1). Due to the material balance in the facility, $CO_2$ corresponding to the carbon amount of the carbon-based raw material introduced into the combustion device is discharged to the outside of the power generating facility. The discharged $CO_2$ may be recovered and used through a technique such as Carbon Dioxide Capture and Storage (CCS) or Enhanced Oil Recovery (EOR).

By using the exhaust heat of the synthesis gas generating facility and the ammonia synthesis facility (hereinafter, sometimes referred to as ammonia production facility) in the power generating facility, it is possible to further improve the efficiency of the power generating facility and to improve energy saving by effectively using the exhaust heat.

By using the combustion device using high-purity oxygen, the recovery rate of $CO_2$ has been limited to about 90% due to economic constraints, but it is possible to recover almost the entire amount of $CO_2$ without significant economic restrictions.

Figure 2:
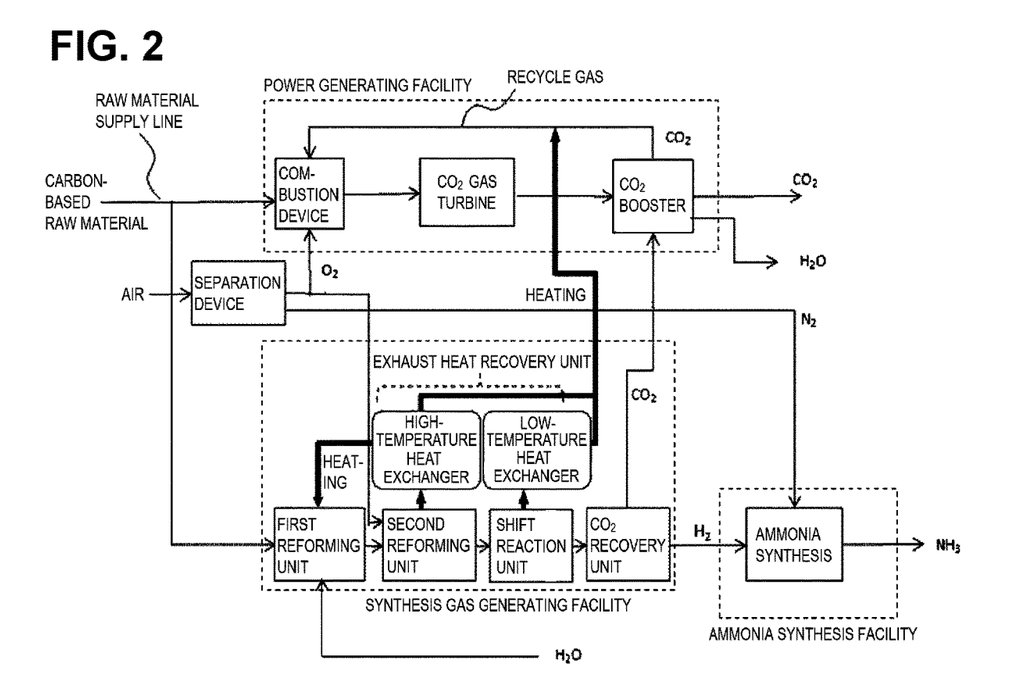
FIG. 2 illustrates a schematic view of the first aspect of the ammonia production plant according to the invention.

An aspect of FIG. 2 illustrates a more preferable aspect of the first aspect of FIG. 1.

In the aspect of FIG. 2, the synthesis gas generating facility includes a $CO_2$ recovery unit which recovers a $CO_2$ gas contained in the synthesis gas. Further, the ammonia production plant of the embodiment further includes a separation device which separates air into oxygen and nitrogen. The separation device is not particularly limited if oxygen and nitrogen can be separated, but the PSA method or the cryogenic separation method can be used without particular limitation. When high-concentration oxygen is required in a large ammonia device, a cryogenic separation type separation device is preferable. In cryogenic separation, air is cooled to a level of −180° C. and is liquefied and distilled to separate nitrogen and oxygen and the power generated by the power generating facility is used as the power of the compressor that generates cold heat. The separated nitrogen is used in the ammonia synthesis facility.

The synthesis gas generating facility includes a first reforming unit which reforms the carbon-based raw material and a second reforming unit which reforms the carbon-based raw material not reformed by the first reforming unit. Further, the synthesis gas generating facility may include a shift reaction unit which converts CO generated by the reforming reaction in the first reforming unit and the second reforming unit into $CO_2$. The shift reaction unit is the same as the aspect illustrated in FIG. 1.

The first reforming unit is configured to reform the carbon-based raw material by a water vapor reforming reaction. The second reforming unit is configured to reform the carbon-based raw material by a partial oxidation reaction. The separation device is configured to supply oxygen to the combustion device and the second reforming unit. In the embodiment, the first reforming unit mainly reforms a hydrocarbon having 2 or more carbon atoms (a component heavier than methane and hereinafter, sometimes referred to as a C2 plus component). Further, the second reforming unit mainly reforms methane.

In the embodiment, the first reforming unit is provided on the upstream of the second reforming unit. When the first reforming unit is provided on the upstream of the second reforming unit, the carbon-based raw material in which the C2 plus component is reformed is supplied to the second reforming unit and the carbon-based raw material (that is, mainly methane) not reformed by the first reforming unit can be reformed by the second reforming unit. That is, since the heavy components contained in the carbon-based raw material to be reformed in the second reforming unit are reduced, the generation of unburned carbon is suppressed. Accordingly, it is possible to prolong the life of the catalyst and the device of the second reforming unit operated at a high temperature.

The water vapor reforming performed in the first reforming unit is an endothermic reaction and the C2 plus component is reformed so that CO and $H_2$ can be obtained. Further, the partial oxidation reaction performed in the second reforming unit is an exothermic reaction and methane is partially oxidized. By the partial oxidation reaction, heat is supplied to the water vapor reforming reaction corresponding to an endothermic reaction so that CO and $H_2$ corresponding to the synthesis gas can be obtained. A mixed gas of CO, $CO_2$, $H_2$, and unreacted methane can be obtained from the second reforming unit.

In the embodiment, the exhaust heat discharged from the second reforming unit is recovered by the exhaust heat recovery unit and a part of the exhaust heat is used for the heating of the first reforming unit and for heating the recycle gas sent to the combustion device.

High-temperature exhaust heat of 800° C. to 1100° C. is generated at the outlet of the second reforming unit. Conventionally, this heat is used to generate steam of 300° C. to 400° C. and the high-temperature exhaust heat is not efficiently used. In the embodiment, the high-temperature exhaust heat is used to heat the recycle gas sent to the combustion device and is used for the heating of the first reforming unit. Accordingly, it is possible to further improve the thermal efficiency.

For such a second reforming unit, an auto thermal reformer may be used and the plant can be enlarged. In the auto thermal reformer, self-heating is performed by reaction heat generated by a partial oxidation reaction with oxygen, an external heat supply is not required, and an adiabatic reactor is used. Further, steam reforming also proceeds at the same time by this self-heating.

In the embodiment, the exhaust heat recovery unit includes a high-temperature heat exchanger which recovers high-temperature exhaust heat having a predetermined temperature and a low-temperature heat exchanger which recovers low-temperature exhaust heat having a temperature lower than that of the high-temperature exhaust heat. The high-temperature heat exchanger recovers the high-temperature exhaust heat generated in the second reforming unit and the low-temperature heat exchanger recovers the low-temperature exhaust heat generated in the shift reaction unit.

The high-temperature heat exchanger recovers heat of 500° C. to 1100° C. and the low-temperature heat exchanger recovers heat which is generated by the shift reaction and is lower than the high-temperature exhaust heat.

The exhaust heat recovered by the exhaust heat recovery unit, particularly, apart of the high-temperature exhaust heat is used to heat the recycle gas pressurized by the booster. In this way, when the high-temperature exhaust heat is used to heat the recycle gas, the heat can be efficiently used and the high-temperature $CO_2$ gas can be supplied to the combustion device. Accordingly, it is possible to reduce the amount of fuel supplied to the combustion device. For that reason, it is possible to highly efficiently operate the power generating facility as compared with a case in which the recycle gas is not heated by the high-temperature exhaust heat.

A part of the low-temperature exhaust heat recovered by the low-temperature heat exchanger is used to generate water vapor necessary for at least the water vapor reforming reaction. Specifically, a part of the low-temperature exhaust heat may be used to raise the temperature of the water or may be used as heat for vaporizing water.

Oxygen obtained by the separation device is supplied to the combustion device of the embodiment. The combustion device burns the oxygen and the natural gas. That is, the combustion device of the embodiment burns substantially pure oxygen and the natural gas. However, the oxygen supplied to the combustion device may have high purity. For example, a high-concentration oxygen gas having an oxygen concentration of 95% or more may be used for combustion.

Figure 3:
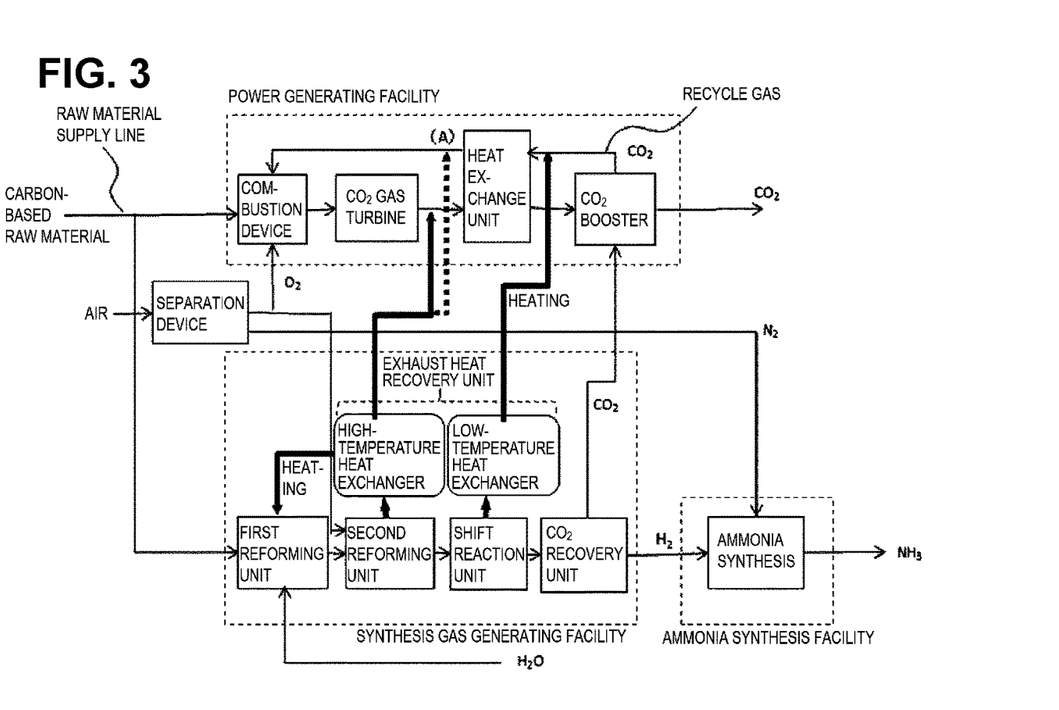
FIG. 3 illustrates another schematic view of the first aspect of the ammonia production plant according to the invention.

As another aspect of the first aspect of the invention, the exhaust heat recovered by the exhaust heat recovery unit is used to heat a $CO_2$ gas which is a $CO_2$ gas discharged from the gas turbine and will be supplied to the booster and the recycle gas may be heated by the heated $CO_2$ gas. Specifically, as illustrated in FIG. 3, the power generating device may include a heat exchange unit which is provided between the gas turbine and the booster so as to exchange heat between the $CO_2$ gas discharged from the gas turbine and the recycle gas ($CO_2$ gas). Then, the high-temperature exhaust heat recovered by the exhaust heat recovery unit (the high-temperature heat exchanger) may heat the $CO_2$ gas discharged from the gas turbine and the heat exchange unit may heat the recycle gas by the heated $CO_2$ gas.

As described above, when the recycle gas is indirectly heated by heating the $CO_2$ gas discharged from the gas turbine, it is possible to relax the design condition of the high-temperature heat exchanger and to reduce the cost of the high-temperature heat exchanger. That is, when the recycle gas is directly heated at the outlet of the heat exchange unit (when the recycle gas is heated at a position A indicated by the dashed line of FIG. 3), designing the high-temperature heat exchanger based on the high-pressure (post-pressurized) recycled gas increases the design pressure of the high-temperature heat exchanger. In contrast, when the $CO_2$ gas is heated at a position in which a pressure is relatively low, the high-temperature heat exchanger can be designed on the basis of the low-pressure recycle gas and hence the device cost can be reduced.

Second Aspect

Figure 4:
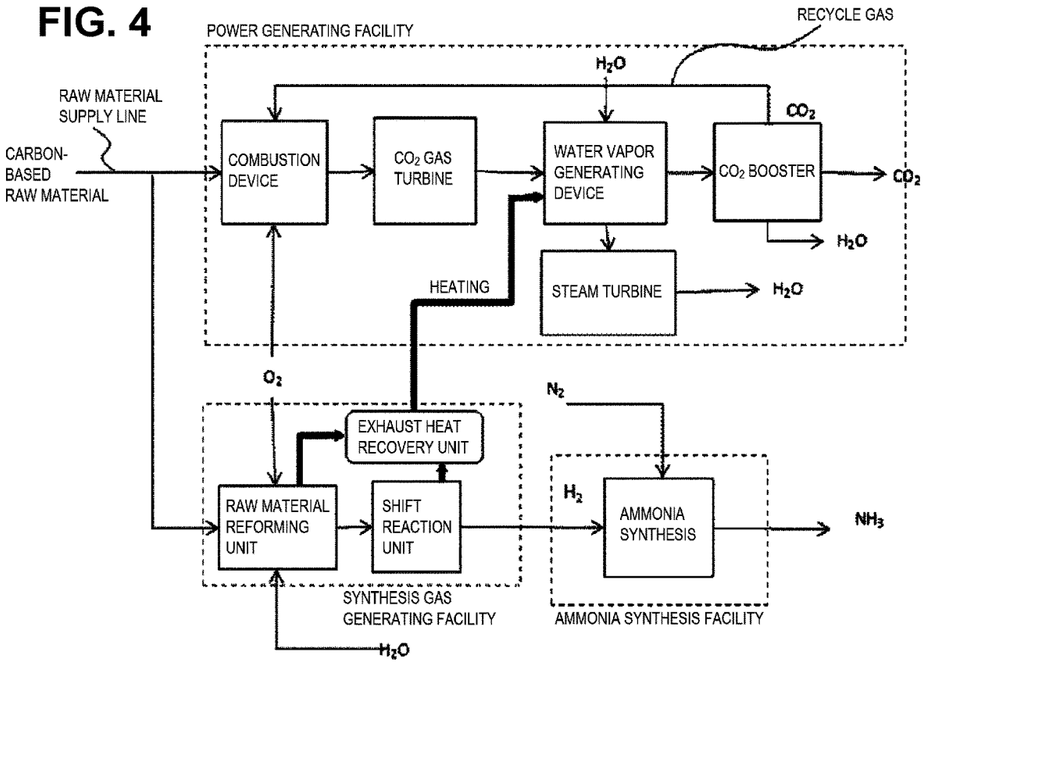
FIG. 4 illustrates a schematic view of a second aspect of the ammonia production plant according to the invention.

FIG. 4 illustrates a schematic view of another aspect of the ammonia production plant according to the invention. In addition, the same reference numerals will be given to the components common to the first aspect and a description thereof will not be repeated.

In an aspect of the ammonia production plant according to the embodiment, the synthesis gas generating facility includes an exhaust heat recovery unit which recovers exhaust heat generated when generating a synthesis gas, the power generating facility includes a combustion device which burns oxygen and fuel, a water vapor generating device which generates water vapor by exhaust heat of a combustion gas containing a $CO_2$ gas obtained from the combustion device, and a steam turbine which is driven by using the water vapor generated in the water vapor generating device as power so as to generate power and is configured to supply the $CO_2$ gas discharged from the water vapor generating device as a recycle gas to the combustion device, the power obtained by the power generating facility is used as at least power of the ammonia synthesis facility, and the exhaust heat recovered by the exhaust heat recovery unit is used to generate water vapor in the water vapor generating device.

In the aspect of FIG. 4, the power generating facility includes the gas turbine which is driven by using the combustion gas containing the $CO_2$ gas obtained by combustion as power and the water vapor generating device generates water vapor by exhaust heat of the gas turbine.

The aspect of FIG. 4 uses the concept of gas turbine combined cycle power generation. In the embodiment, the exhaust heat in the exhaust gas discharged from the gas turbine is used as a heat source of the water vapor generating device and water vapor is generated by using the exhaust heat recovered in the exhaust heat recovery unit as a heat source. The $CO_2$ gas discharged from the water vapor generating device and the gas containing water vapor are pressurized by the booster and are supplied as the recycle gas to the combustion device.

In the aspect of FIG. 4, the high-temperature exhaust gas (about 700° C.) discharged from the gas turbine is heated by the heat recovered by the exhaust heat recovery unit and the heated exhaust gas is supplied to, for example, an exhaust heat recovery boiler which is the water vapor generating device. The heated exhaust gas is used as a heat source for generating water vapor and the steam turbine is driven by using the generated water vapor.

Figure 5:
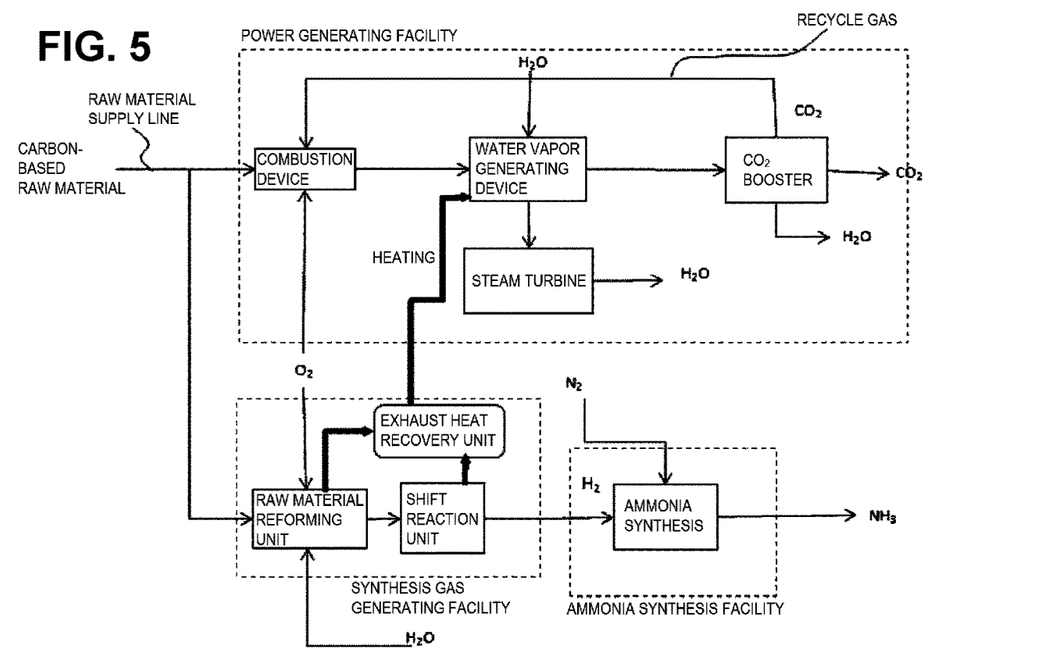
FIG. 5 illustrates another schematic view of the second aspect of the ammonia production plant according to the invention.

In the aspect of FIG. 4, a case in which the power generating device includes the gas turbine has been described, but the power generating device may not include the gas turbine. Specifically, as illustrated in FIG. 5, the power generating device may include a combustion device and a water vapor generating device and may be configured to supply a $CO_2$ gas discharged from the water vapor generating device as a recycle gas to the combustion device. Also in this configuration, it is possible to provide a highly energy-saving ammonia production plant capable of reducing an emission amount of a $CO_2$ gas and recovering the $CO_2$ gas with high efficiency as a whole.

Figure 6:
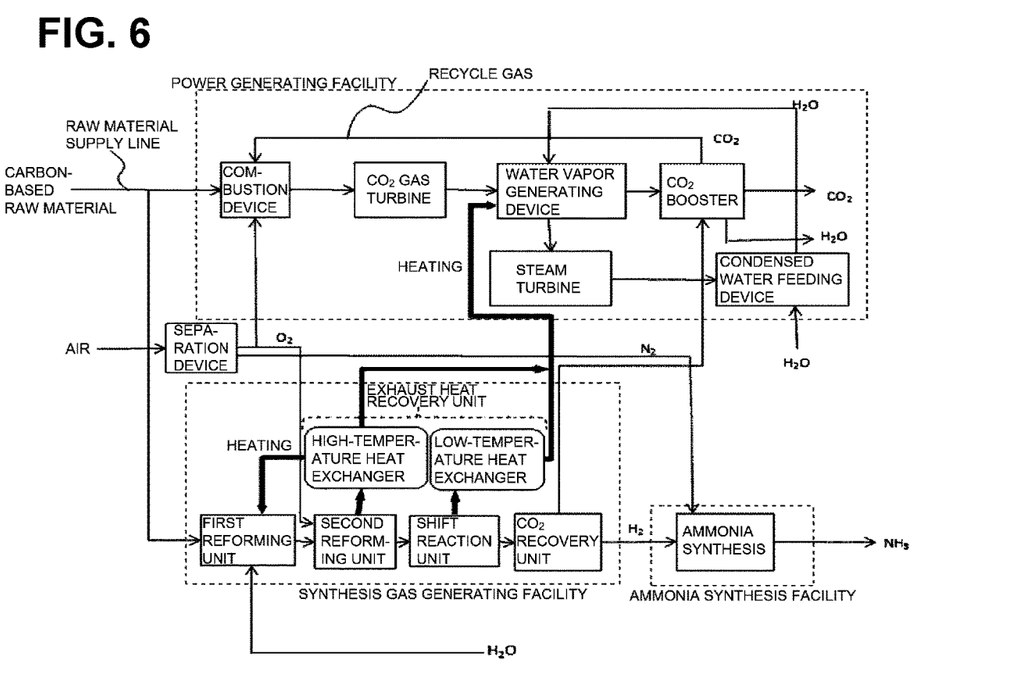
FIG. 6 illustrates a schematic view of the second aspect of the ammonia production plant according to the invention.

FIG. 6 illustrates a more preferable aspect of the second aspect illustrated in FIG. 4.

In the aspect of FIG. 6, the power generating facility includes a pumping device which carries condensed water used for driving the steam turbine to the water vapor generating device along with water supplied from the outside. The condensed water becomes water vapor again in the water vapor generating device and is used to drive the steam turbine. In this way, the condensed water circulates between the water vapor generating device and the pumping device.

The synthesis gas generating facility is configured to recover a $CO_2$ gas contained in the synthesis gas and the booster is configured to pressurize the $CO_2$ gas discharged from the gas turbine and the recovered $CO_2$ gas. Similarly to the aspect of FIG. 2, the synthesis gas generating facility includes the first reforming unit which reforms the carbon-based raw material and the second reforming unit which reforms the carbon-based raw material not reformed by the first reforming unit. The second reforming unit is configured to reform the carbon-based raw material by using a partial oxidation reaction and the separation device is configured to supply oxygen to the combustion device and the second reforming unit. The first reforming unit and the second reforming unit are the same as those of the aspect of FIG. 2 and an auto thermal reformer may be used in the second reforming unit.

The exhaust heat recovery unit includes a high-temperature heat exchanger which recovers high-temperature exhaust heat having a predetermined temperature and a low-temperature heat exchanger which recovers low-temperature exhaust heat having a temperature lower than that of the high-temperature exhaust heat. The high-temperature heat exchanger is configured to recover the high-temperature exhaust heat generated in the second reforming unit and the low-temperature heat exchanger is configured to recover the low-temperature exhaust heat generated in the shift reaction unit.

In the embodiment, a part of the high-temperature exhaust heat recovered by the high-temperature heat exchanger is used for the heating of the first reforming unit. Further, the high-temperature exhaust heat recovered by the high-temperature heat exchanger and the low-temperature exhaust heat recovered by the low-temperature heat exchanger are used to generate water vapor in the water vapor generating device. Specifically, the high-temperature exhaust heat recovered by the high-temperature heat exchanger is used to generate water vapor by vaporizing water in the water vapor generating device. Meanwhile, the low-temperature exhaust heat recovered by the low-temperature heat exchanger is used to heat condensed water obtained after driving the steam turbine. For example, the low-temperature heat exchanger is provided on the downstream of the pumping device. In this way, when the exhaust heat is used, the heat can be efficiently used.

The synthesis gas from which carbon dioxide, which is a catalyst poison for ammonia synthesis, has been removed is sent to a nitrogen cleaning device (not illustrated) as necessary and is sent to an ammonia synthesis facility after removing an inert gas component (also referred to as an inert component) by cryogenic separation. Alternatively, the synthesis gas from which carbon dioxide has been removed is sent to a methanation device so that a small amount of carbon monoxide and carbon dioxide remaining in the synthesis gas are converted into methane which becomes inactive to the ammonia synthesis catalyst by the methanation reaction and the methane may be sent to the ammonia synthesis facility.

Hydrogen and nitrogen obtained in the synthesis gas generating facility and the separation device are pressurized to a synthesis pressure (15 bar to 80 bar) for ammonia synthesis by a compressor (not illustrated) and the temperature rises to an ammonia synthesis reaction start temperature (about 400° C. to 500° C.) so that hydrogen and nitrogen are used for an ammonia synthesis reaction. The obtained ammonia is separated and recovered as an ammonia product via a known separation facility such as cooling separation using a refrigeration compressor.

Ammonia synthesis can be performed by a known ammonia synthesis process.

As an ammonia synthesis process, for example, a Haber-Bosch method using an iron-based catalyst can be employed. In the Haber-Bosch method, a synthesis reaction is performed under a high pressure of 200 bar or more and is also called a high-pressure method. Further, as the ammonia synthesis process, a method of synthesizing ammonia under a low pressure condition using a ruthenium catalyst (low pressure method) can also be adopted. In the ammonia synthesis process using a ruthenium catalyst, a catalyst in which a ruthenium catalyst is carried on a carrier can be used. As a carrier for carrying ruthenium, alumina or a rare earth oxide can be used as a carrier for the catalyst. Recently, an ammonia synthesis method has been proposed in which hydrogen (ion) supplied through a proton exchange membrane is reacted with nitrogen.

As the catalyst used in each synthesis reaction in the above-described embodiment, a known catalyst can be adopted.

In the above-described embodiment, the auto thermal reformer is adopted in the second reforming unit and high-purity oxygen obtained by the separation device is supplied to the combustion device. With this configuration, a flue gas is removed and almost all $CO_2$ gas discharged from the combustion device can be recovered with energy saving.

In the above-described embodiment, the invention relating to the ammonia production plant has been mainly described, but the invention may be considered as the invention relating to the ammonia production method of producing ammonia. That is, an ammonia production method according to a first aspect is an ammonia production method of producing ammonia from a carbon-based raw material, including: an ammonia synthesizing step of synthesizing ammonia; a synthesis gas generating step of generating a synthesis gas for synthesizing ammonia from the carbon-based raw material; and a power generating step of obtaining power, in which the synthesis gas generating step includes a step of recovering exhaust heat generated when generating the synthesis gas, in which the power generating step includes a step of burning oxygen and fuel by a combustion device, a step of generating power by a gas turbine driven by using a combustion gas containing a $CO_2$ gas obtained by the combustion as power, and a step of supplying the $CO_2$ gas discharged from the gas turbine as a recycle gas to the combustion device, in which in at least the ammonia synthesizing step, the power obtained by the power generating step is used as power for synthesizing ammonia, and in which in the power generating step, the exhaust heat recovered by the synthesis gas generating step is used to heat the recycle gas.

Further, an ammonia production method according to a second aspect is an ammonia production method of producing ammonia from a carbon-based raw material, including: an ammonia synthesizing step of synthesizing ammonia; a synthesis gas generating step of generating a synthesis gas for synthesizing ammonia from the carbon-based raw material; and a power generating step of obtaining power, in which the synthesis gas generating step includes a step of recovering exhaust heat generated when generating the synthesis gas, in which the power generating step includes a step of burning oxygen and fuel by a combustion device, a step of generating water vapor by a water vapor generating device using exhaust heat of a combustion gas containing a $CO_2$ gas obtained by the combustion, a step of generating power by a steam turbine driven by using the water vapor as power, and a step of supplying the $CO_2$ gas discharged from the water vapor generating device as a recycle gas to the combustion device, in which in at least the ammonia synthesizing step, the power obtained by the power generating step is used as power for synthesizing ammonia, and in which in the power generating step, the exhaust heat recovered by the synthesis gas generating step is used to generate water vapor for driving the steam turbine.

Further, the ammonia production method according to the second aspect includes a step of generating power by the gas turbine driven by using the combustion gas obtained by the combustion device as power and the exhaust heat of the gas turbine may be used to generate water vapor.

According to the embodiment, since high-purity oxygen and fuel are burned in the combustion device and the highly efficient power generating facility is adopted, a consumption amount of a raw material for synthesizing ammonia is suppressed. Accordingly, it is possible to construct a highly energy-saving ammonia production plant capable of reducing an emission amount of a $CO_2$ gas and recovering the discharged $CO_2$ gas with high efficiency. Further, since a process adopting an auto thermal reformer and not discharging a flue gas is constructed, it is possible to eliminate the loss of expensive solvents used in the $CO_2$ recovery device for recovering $CO_2$ in a flue gas and the large energy required for $CO_2$ separation from solvents. As described above, according to the embodiment, it is possible to reduce the energy consumption amount of the plant by as much as 20% even when the separation device separating air into oxygen and nitrogen is used.

Further, since the ammonia production plant includes the separation device, the separation device can be shared in the synthesis gas generating facility and the power generating facility. For that reason, the facility cost can be suppressed. Further, the separation device may supply nitrogen to the ammonia synthesis facility. In this case, the separation device can be shared in three facilities of the synthesis gas generating facility, the power generating facility, and the ammonia synthesis facility.

Since the exhaust heat of the synthesis gas generating facility is used in the power generating facility, it is possible to further improve the efficiency of the power generating facility and to improve the energy saving according to the effective usage of the exhaust heat.

Although a $CO_2$ gas has been recovered to only about 90% due to economic constraints, since the combustion device burning high-purity oxygen and fuel is used, all $CO_2$ can be recovered without significant economic restrictions.

Further, since the synthesis gas generating facility and the power generating facility are designed so as to start up independently, if the minimum power supply required for start-up is provided, the ammonia plant can be started up without $CO_2$ emissions using the waste heat of the power generating facility without a conventional start-up combustion device used only for start-up. Specifically, in the embodiment, it is possible to drive the gas turbine by starting up the combustion device and obtain power in the ammonia production plant. Further, it is possible to generate water vapor necessary for the reforming reaction or the like by the exhaust heat of the gas turbine. In this way, according to the embodiment, there is no need to provide the start-up combustion device and the cost of the device can be reduced as a whole.

Additionally, the ammonia production plant of the invention is not limited to the above-described embodiment and can be, of course, modified into various forms in the range not departing from the spirit of the invention.

Although not particularly mentioned in the above-described embodiment, in the second aspect, the water vapor extracted from the steam turbine may be supplied as the water vapor used in a water vapor reforming reaction to the first reforming unit or the second reforming unit. Further, water vapor may be generated when recovering waste heat (heat generated during ammonia synthesis) discharged from the ammonia synthesis facility and the water vapor may be used as water vapor used in the water vapor reforming reaction in the first reforming unit or the second reforming unit.

Although not particularly mentioned in the above-described embodiment, the ammonia production plant may include a desulfurization device which removes sulfur contained in the carbon-based raw material. For example, the desulfurization device may be provided in a raw material supply line illustrated in FIG. 1 so that the desulferized carbon-based raw material is supplied to the synthesis gas generating facility and the power generating facility. In this case, when the desulfurization device is shared in the synthesis gas generating facility and the power generating facility, it is possible to reduce the cost of treating wastewater from the power generating facility.

In the above-described embodiment, a case in which the exhaust heat generated by the synthesis gas generating facility is used in the power generating facility has been mainly described, but the invention is not limited thereto. The exhaust heat generated by the ammonia synthesis facility may be used in the power generating facility so as to improve energy saving. Specifically, although not illustrated in the drawings, an outlet gas of an ammonia synthesis reactor provided in the ammonia synthesis facility may be used to generate water vapor using the water vapor generating device or may be used to heat the recycle gas.

Although not particularly mentioned in the above-described embodiment, when coal is used as the carbon-based raw material, the synthesis gas generating facility includes a gasification furnace for gasifying coal instead of the first reforming unit and the second reforming unit. In the aspect, the exhaust heat recovery unit may recover exhaust heat generated when generating a synthesis gas in the gasification furnace. The synthesis gas obtained by the gasification furnace is supplied as fuel to the combustion device. Specifically, the synthesis gas obtained by the gasification furnace may be sent to the shift reaction unit after heavy metal is removed therefrom and the synthesis gas obtained by the shift reaction unit may be supplied as fuel to the combustion device. Further, oxygen obtained by the separation device may be supplied to the gasification furnace so as to gasify coal.

The invention claimed is:

1. An ammonia production plant for producing ammonia from a carbon-based raw material, comprising:
   an ammonia synthesis facility which synthesizes ammonia;
   a synthesis gas generating facility which generates a synthesis gas for synthesizing ammonia from the carbon-based raw material; and
   a power generating facility which obtains power,
   wherein the synthesis gas generating facility includes an exhaust heat recovery unit which recovers exhaust heat generated when generating the synthesis gas,
   wherein the power generating facility includes a combustion device which burns oxygen and fuel, and a gas turbine which is driven by using a combustion gas containing a $CO_2$ gas obtained by the combustion device as power so as to generate power and is configured to supply the $CO_2$ gas discharged from the gas turbine as a recycle gas to the combustion device,
   wherein the power obtained by the power generating facility is used as at least power of the ammonia synthesis facility, and
   wherein the exhaust heat recovered by the exhaust heat recovery unit is used to heat the recycle gas.

2. The ammonia production plant according to claim 1,
   wherein the power generating facility includes a booster which supplies the $CO_2$ gas discharged from the gas turbine as the recycle gas to the combustion device,
   wherein the synthesis gas generating facility is configured to recover the $CO_2$ gas contained in the synthesis gas, and
   wherein the booster pressurizes the $CO_2$ gas discharged from the gas turbine and the recovered $CO_2$ gas.

3. The ammonia production plant according to claim 1, further comprising:
   a separation device which separates air into oxygen and nitrogen,
   wherein the synthesis gas generating facility includes a first reforming unit which reforms the carbon-based raw material and a second reforming unit which reforms the carbon-based raw material not reformed by the first reforming unit,
   wherein the second reforming unit is configured to reform the carbon-based raw material by a partial oxidation reaction, and
   wherein the separation device is configured to supply oxygen to the combustion device and the second reforming unit.

4. The ammonia production plant according to claim 1,
   wherein the exhaust heat recovery unit includes a high-temperature heat exchanger which recovers high-temperature exhaust heat having a predetermined temperature and a low-temperature heat exchanger which recovers low-temperature exhaust heat having a temperature lower than that of the high-temperature exhaust heat,
   wherein the synthesis gas generating facility includes a first reforming unit which reforms the carbon-based raw material, a second reforming unit which reforms the carbon-based raw material not reformed by the first reforming unit, and a shift reaction unit which converts CO generated by a reforming reaction in the first reforming unit and the second reforming unit into $CO_2$, and
   wherein the high-temperature heat exchanger recovers the high-temperature exhaust heat generated in the second reforming unit and the low-temperature heat exchanger recovers the low-temperature exhaust heat generated in the shift reaction unit.

5. The ammonia production plant according to claim 4,
   wherein the first reforming unit is configured to reform the carbon-based raw material by a water vapor reforming reaction, and
   wherein a part of the high-temperature exhaust heat recovered by the high-temperature heat exchanger is used for the reforming reaction in the first reforming unit.

6. The ammonia production plant according to claim 4,
   wherein the first reforming unit is configured to reform the carbon-based raw material by a water vapor reforming reaction, and
   wherein a part of the low-temperature exhaust heat recovered by the low-temperature heat exchanger is used to generate water vapor necessary for at least the water vapor reforming reaction.

7. The ammonia production plant according to claim 1,
   wherein the power generating facility includes a booster which supplies the $CO_2$ gas discharged from the gas turbine as the recycle gas to the combustion device,
   wherein the exhaust heat recovered by the exhaust heat recovery unit is used to heat the $CO_2$ gas which is the $CO_2$ gas discharged from the gas turbine and will be supplied to the booster, and
   wherein the recycle gas is heated by the heated $CO_2$ gas.

8. The ammonia production plant according to claim 1,
   wherein the carbon-based raw material is a natural gas or coal.

9. An ammonia production plant for producing ammonia from a carbon-based raw material, comprising:
   an ammonia synthesis facility which synthesizes ammonia;
   a synthesis gas generating facility which generates a synthesis gas for synthesizing ammonia from the carbon-based raw material; and
   a power generating facility which obtains power,
   wherein the synthesis gas generating facility includes an exhaust heat recovery unit which recovers exhaust heat generated when generating the synthesis gas,
   wherein the power generating facility includes a combustion device which burns oxygen and fuel, a water vapor generating device which generates water vapor by exhaust heat of a combustion gas containing a $CO_2$ gas obtained from the combustion device, and a steam turbine which is driven by using the water vapor generated in the water vapor generating device as power so as to generate power and is configured to supply the $CO_2$ gas discharged from the water vapor generating device as a recycle gas to the combustion device,
   wherein the power obtained by the power generating facility is used as at least power of the ammonia synthesis facility, and
   wherein the exhaust heat recovered by the exhaust heat recovery unit is used to generate water vapor in the water vapor generating device.

10. The ammonia production plant according to claim 9,
    wherein the power generating facility includes a gas turbine which is driven by using the combustion gas as power so as to generate power and the water vapor generating device generates water vapor by exhaust heat of the gas turbine.

11. The ammonia production plant according to claim 10, wherein the power generating facility includes a booster which supplies the $CO_2$ gas discharged from the gas turbine as the recycle gas to the combustion device, wherein the synthesis gas generating facility is configured to recover the $CO_2$ gas contained in the synthesis gas, and wherein the booster pressurizes the $CO_2$ gas discharged from the gas turbine and the recovered $CO_2$ gas.

12. The ammonia production plant according to claim 10, further comprising:

a separation device which separates air into oxygen and nitrogen, wherein the synthesis gas generating facility includes a first reforming unit which reforms the carbon-based raw material and a second reforming unit which reforms the carbon-based raw material not reformed by the first reforming unit, wherein the second reforming unit is configured to reform the carbon-based raw material by a partial oxidation reaction, and wherein the separation device is configured to supply oxygen to the combustion device and the second reforming unit.

13. The ammonia production plant according to claim 9, wherein the exhaust heat recovery unit includes a high-temperature heat exchanger which recovers high-temperature exhaust heat having a predetermined temperature and a low-temperature heat exchanger which recovers low-temperature exhaust heat having a temperature lower than that of the high-temperature exhaust heat, wherein the synthesis gas generating facility includes a first reforming unit which reforms the carbon-based raw material, a second reforming unit which reforms the carbon-based raw material not reformed by the first reforming unit, and a shift reaction unit which converts CO generated by a reforming reaction in the first reforming unit and the second reforming unit into $CO_2$, and wherein the high-temperature heat exchanger recovers the high-temperature exhaust heat generated in the second reforming unit and the low-temperature heat exchanger recovers the low-temperature exhaust heat generated in the shift reaction unit.

14. An ammonia production method of producing ammonia from a carbon-based raw material, comprising:

an ammonia synthesizing step of synthesizing ammonia;

a synthesis gas generating step of generating a synthesis gas for synthesizing ammonia from the carbon-based raw material; and a power generating step of obtaining power, wherein the synthesis gas generating step includes a step of recovering exhaust heat generated when generating the synthesis gas, wherein the power generating step includes a step of burning oxygen and fuel by a combustion device, a step of generating power by a gas turbine driven by using a combustion gas containing a $CO_2$ gas obtained by the combustion as power, and a step of supplying the $CO_2$ gas discharged from the gas turbine as a recycle gas to the combustion device, wherein in at least the ammonia synthesizing step, the power obtained by the power generating step is used as power for synthesizing ammonia, and wherein in the power generating step, the exhaust heat recovered by the synthesis gas generating step is used to heat the recycle gas.

15. An ammonia production method of producing ammonia from a carbon-based raw material, comprising:

an ammonia synthesizing step of synthesizing ammonia;

a synthesis gas generating step of generating a synthesis gas for synthesizing ammonia from the carbon-based raw material; and a power generating step of obtaining power, wherein the synthesis gas generating step includes a step of recovering exhaust heat generated when generating the synthesis gas, wherein the power generating step includes a step of burning oxygen and fuel by a combustion device, a step of generating water vapor by a water vapor generating device using exhaust heat of a combustion gas containing a $CO_2$ gas obtained by the combustion, a step of generating power by a steam turbine driven by using the water vapor as power, and a step of supplying the $CO_2$ gas discharged from the water vapor generating device as a recycle gas to the combustion device, wherein in at least the ammonia synthesizing step, the power obtained by the power generating step is used as power for synthesizing ammonia, and wherein in the power generating step, the exhaust heat recovered by the synthesis gas generating step is used to generate the water vapor for driving the steam turbine.

* * * * *